No. 891,817.

PATENTED JUNE 30, 1908.

A. W. COPLAND.
DOUGH AND CRACKER HANDLING MACHINE.
APPLICATION FILED OCT. 5, 1904. RENEWED DEC. 30, 1907.

9 SHEETS—SHEET 1.

WITNESSES

INVENTOR
ALEXANDER W. COPLAND.
BY James Whittemore
ATT'Y.

No. 891,817. PATENTED JUNE 30, 1908.
A. W. COPLAND.
DOUGH AND CRACKER HANDLING MACHINE.
APPLICATION FILED OCT. 5, 1904. RENEWED DEC. 30, 1907.

8 SHEETS—SHEET 2.

WITNESSES
INVENTOR
ALEXANDER W. COPLAND
BY
ATT'Y.

No. 891,817. PATENTED JUNE 30, 1908.
A. W. COPLAND.
DOUGH AND CRACKER HANDLING MACHINE.
APPLICATION FILED OCT. 5, 1904. RENEWED DEC. 30, 1907.

8 SHEETS—SHEET 5.

WITNESSES
INVENTOR
ALEXANDER W. COPLAND.
BY James Whittemore
ATT'Y.

No. 891,817. PATENTED JUNE 30, 1908.
A. W. COPLAND.
DOUGH AND CRACKER HANDLING MACHINE.
APPLICATION FILED OCT. 5, 1904. RENEWED DEC. 30, 1907.

8 SHEETS—SHEET 6.

WITNESSES
Geo. H. Graves
H. C. Smith

INVENTOR
ALEXANDER W. COPLAND
BY James Whittemore
ATT'Y.

No. 891,817. PATENTED JUNE 30, 1908.
A. W. COPLAND.
DOUGH AND CRACKER HANDLING MACHINE.
APPLICATION FILED OCT. 5, 1904. RENEWED DEC. 30, 1907
8 SHEETS—SHEET 3.

WITNESSES
Geo. W. Graves
H. C. Smith

INVENTOR·
ALEXANDER·W·COPLAND·
BY James Whittemore
ATTY.

UNITED STATES PATENT OFFICE.

ALEXANDER W. COPLAND, OF DETROIT, MICHIGAN.

DOUGH AND CRACKER HANDLING MACHINE.

No. 891,817.  Specification of Letters Patent.  Patented June 30, 1908.

Application filed October 5, 1904, Serial No. 227,201. Renewed December 30, 1907. Serial No. 408,697.

*To all whom it may concern:*

Be it known that I, ALEXANDER W. COPLAND, residing at Detroit, in the county of Wayne and State of Michigan, a citizen of the United States, have invented certain new and useful Improvements in Dough and Cracker Handling Machines, of which the following is a specification, reference being had therein to the accompanying drawings.
The invention relates to new and useful improvements in sheet dough and cracker handling machinery, and the invention consists in the construction of a machine designed to take cut dough as it comes for instance from a cracker cutting machine, delivering the cut dough into an oven, and also for removing the baked goods from the oven.

The invention also consists in combining the loading and unloading mechanism with a single actuating device so that the oven may be simultaneously charged with the dough to be baked and the previously baked goods unloaded.

The invention further consists in the construction of the loading mechanism, and also in the construction of the unloading mechanism, and further in the construction, arrangement and combination of the various parts as more fully hereinafter described and particularly pointed out in the claims.

Figure 1:
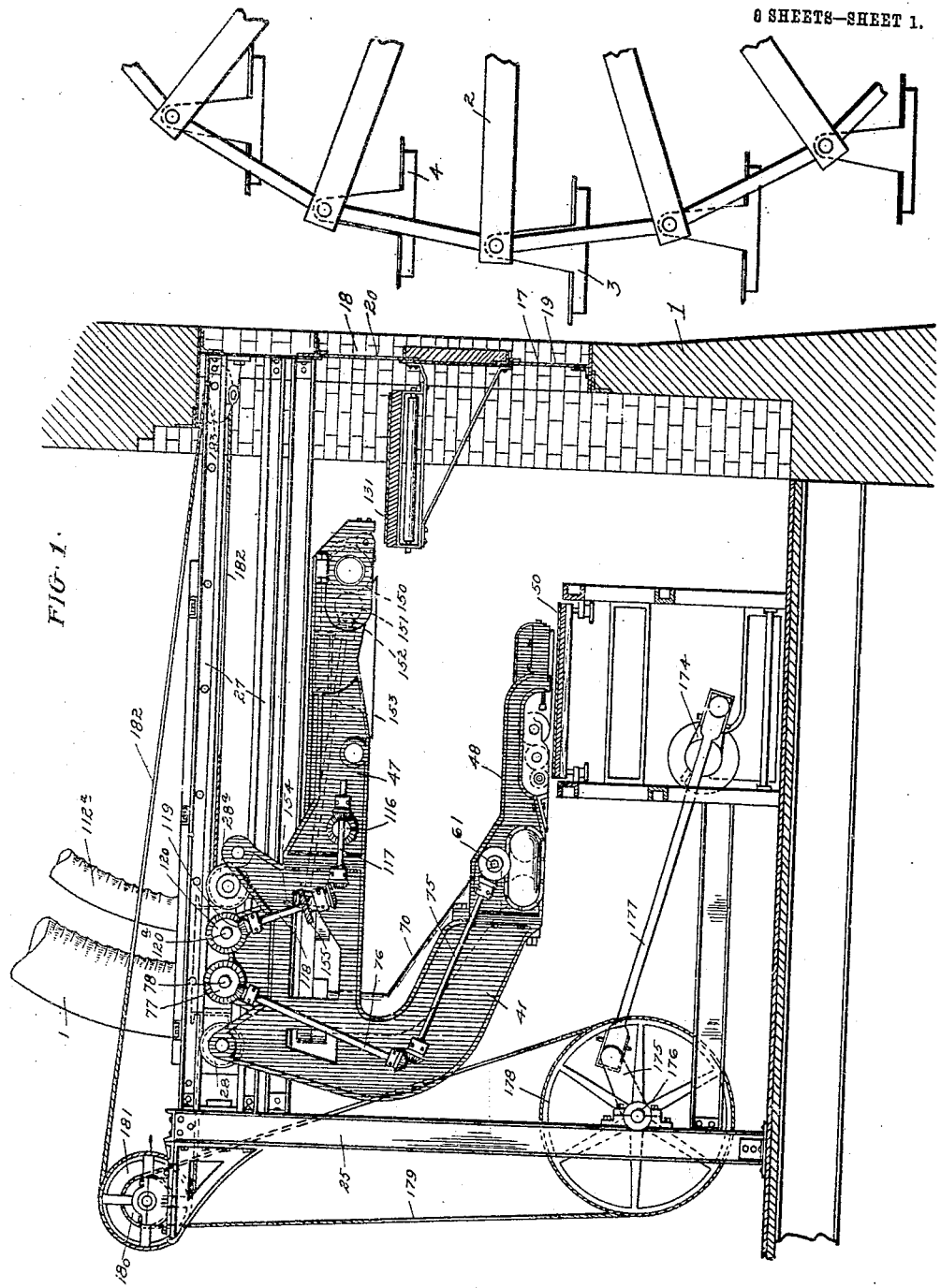
Figure 2:
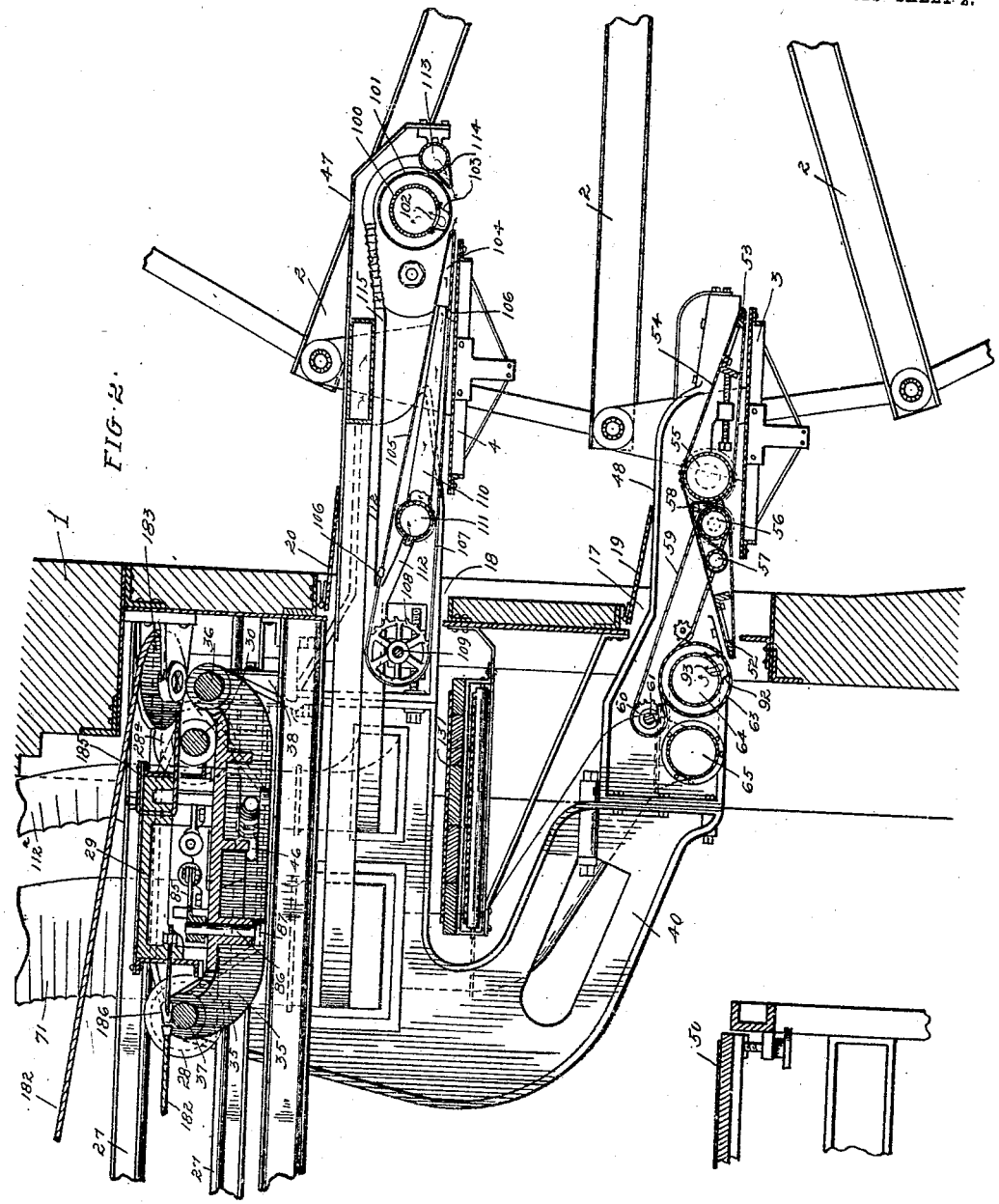
Figure 3:
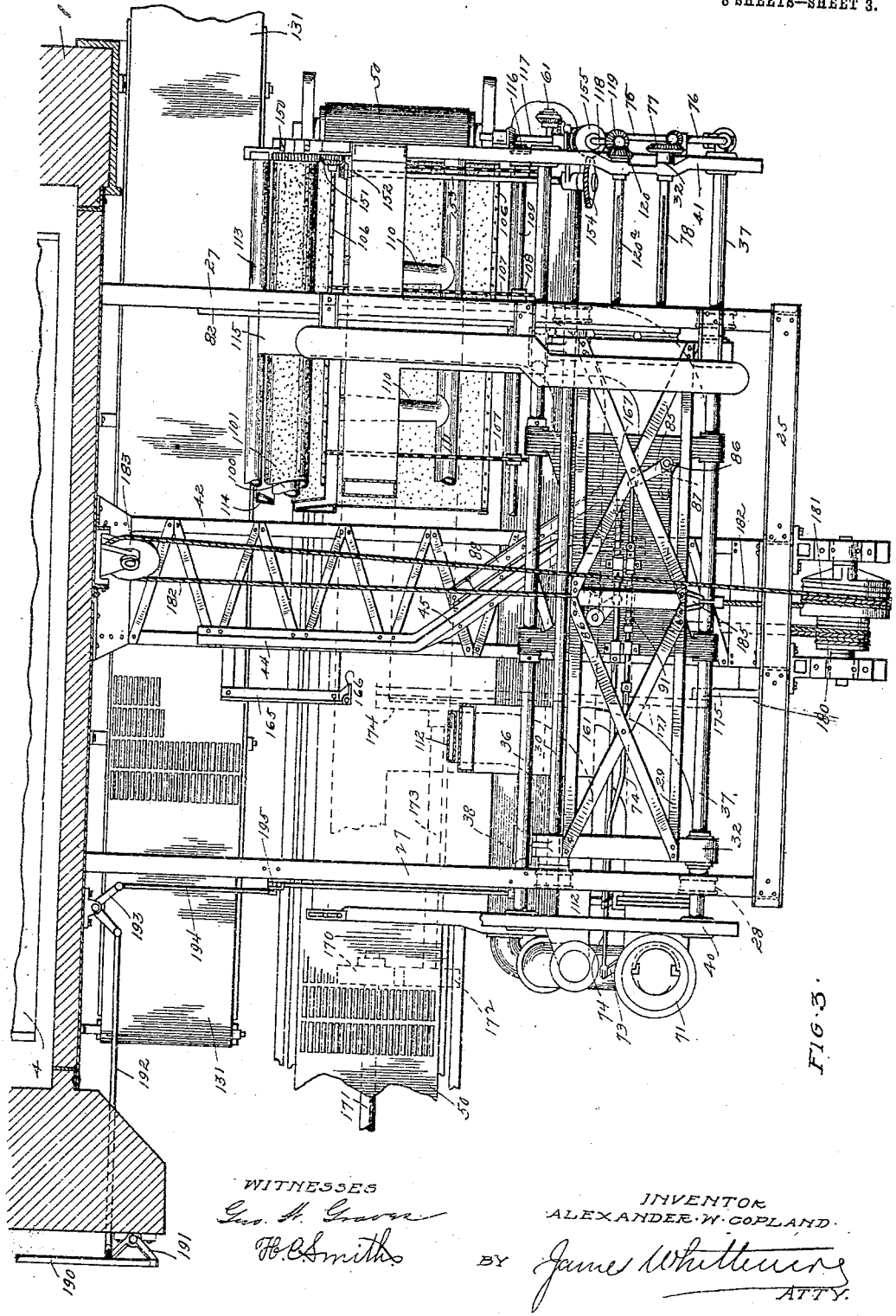
Figure 4:
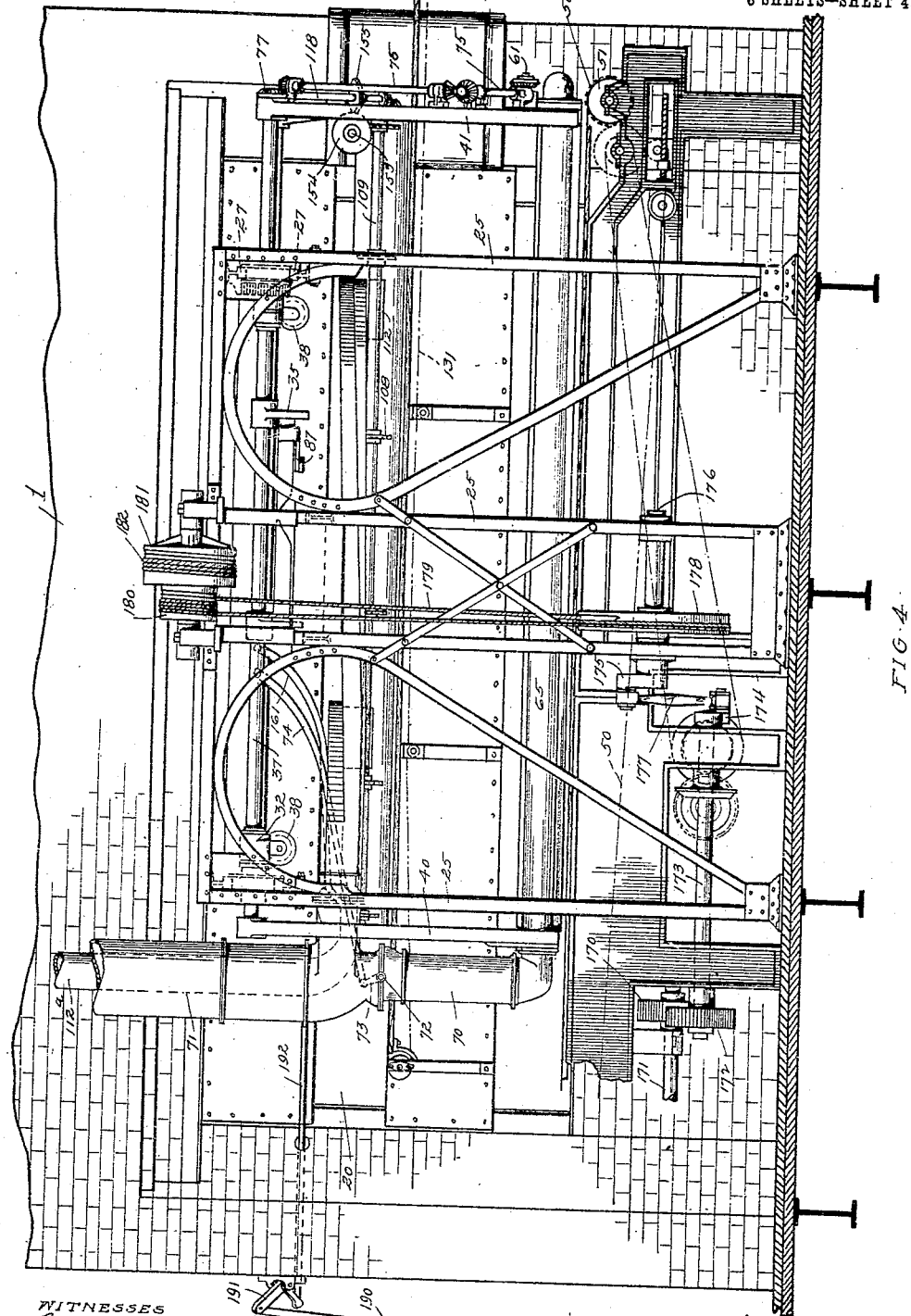
Figure 5:
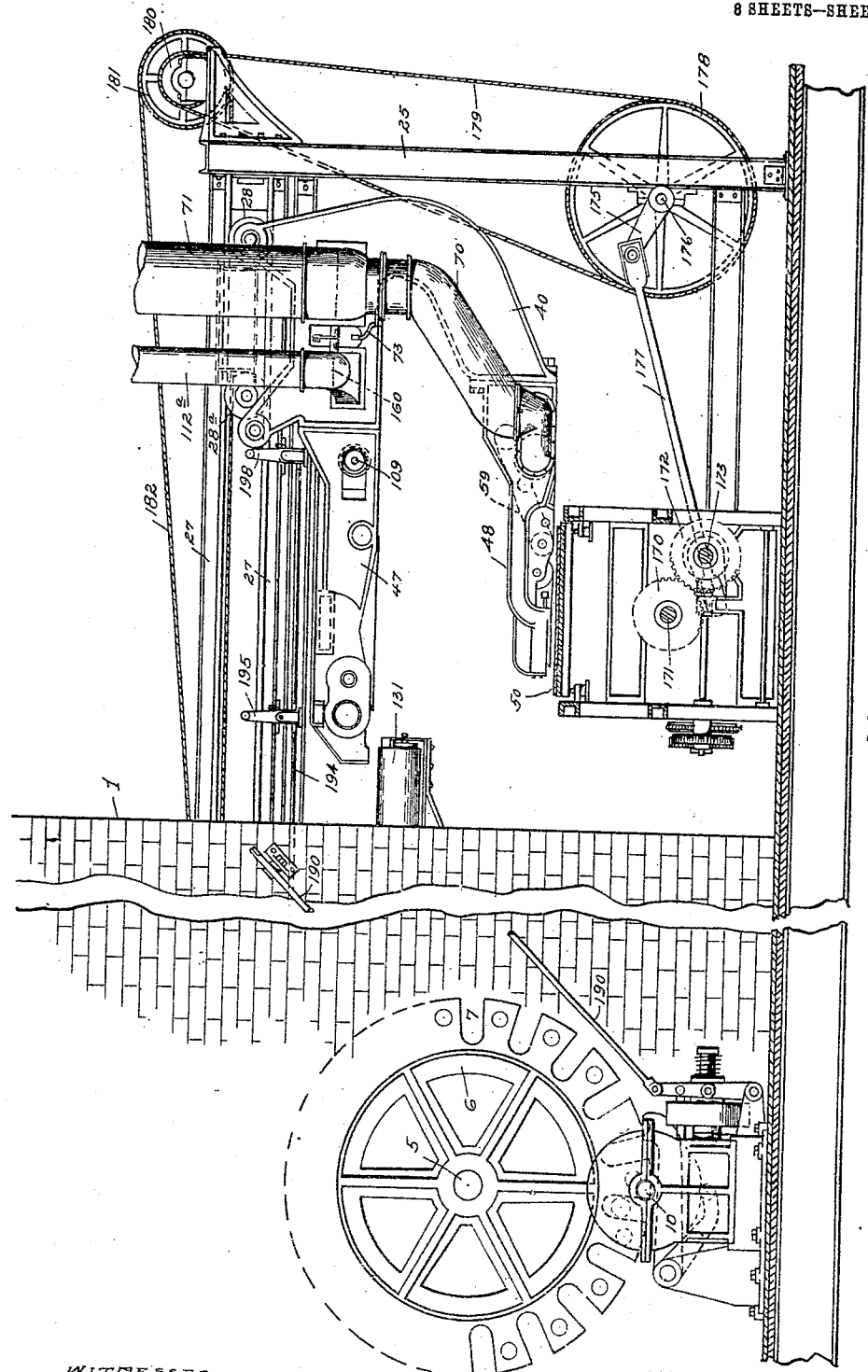
Figure 6:
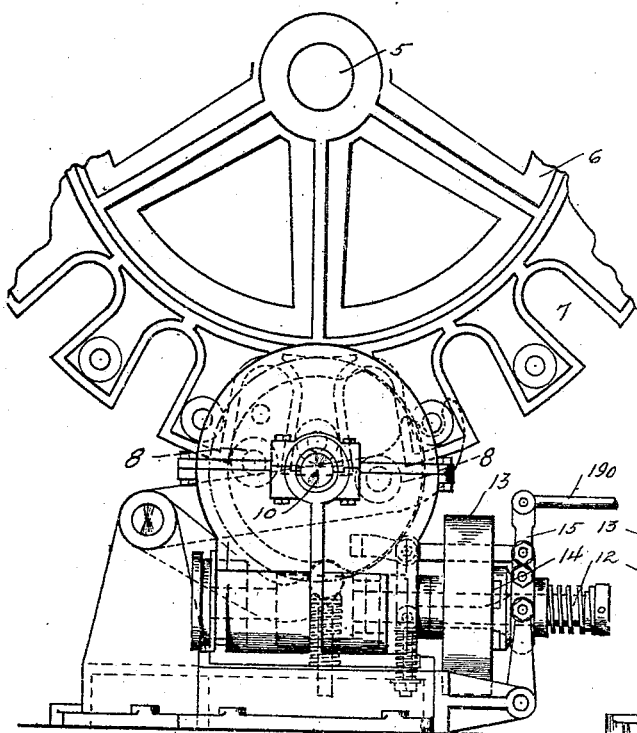
Figure 7:
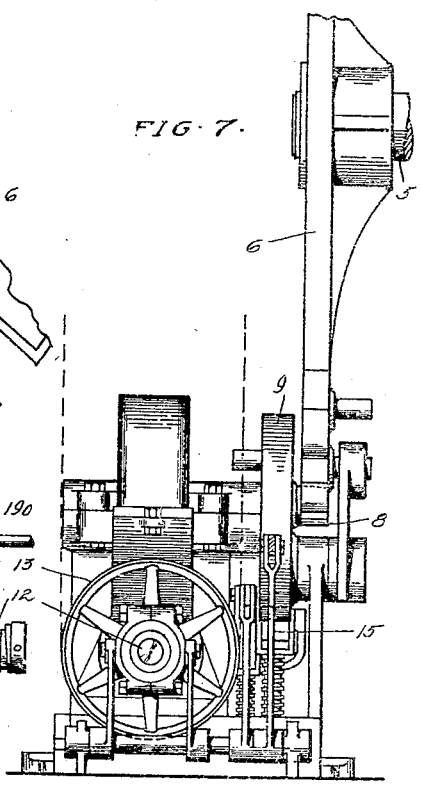
Figure 8:
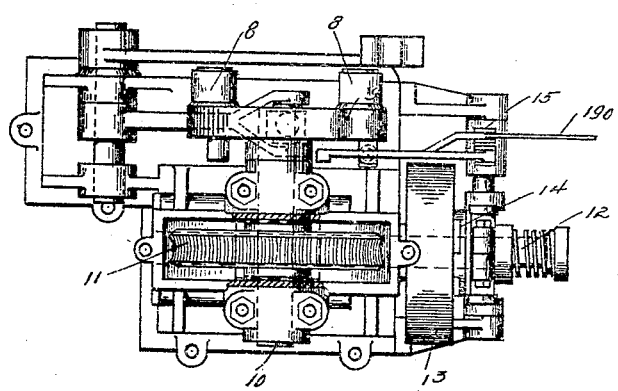
Figure 9:
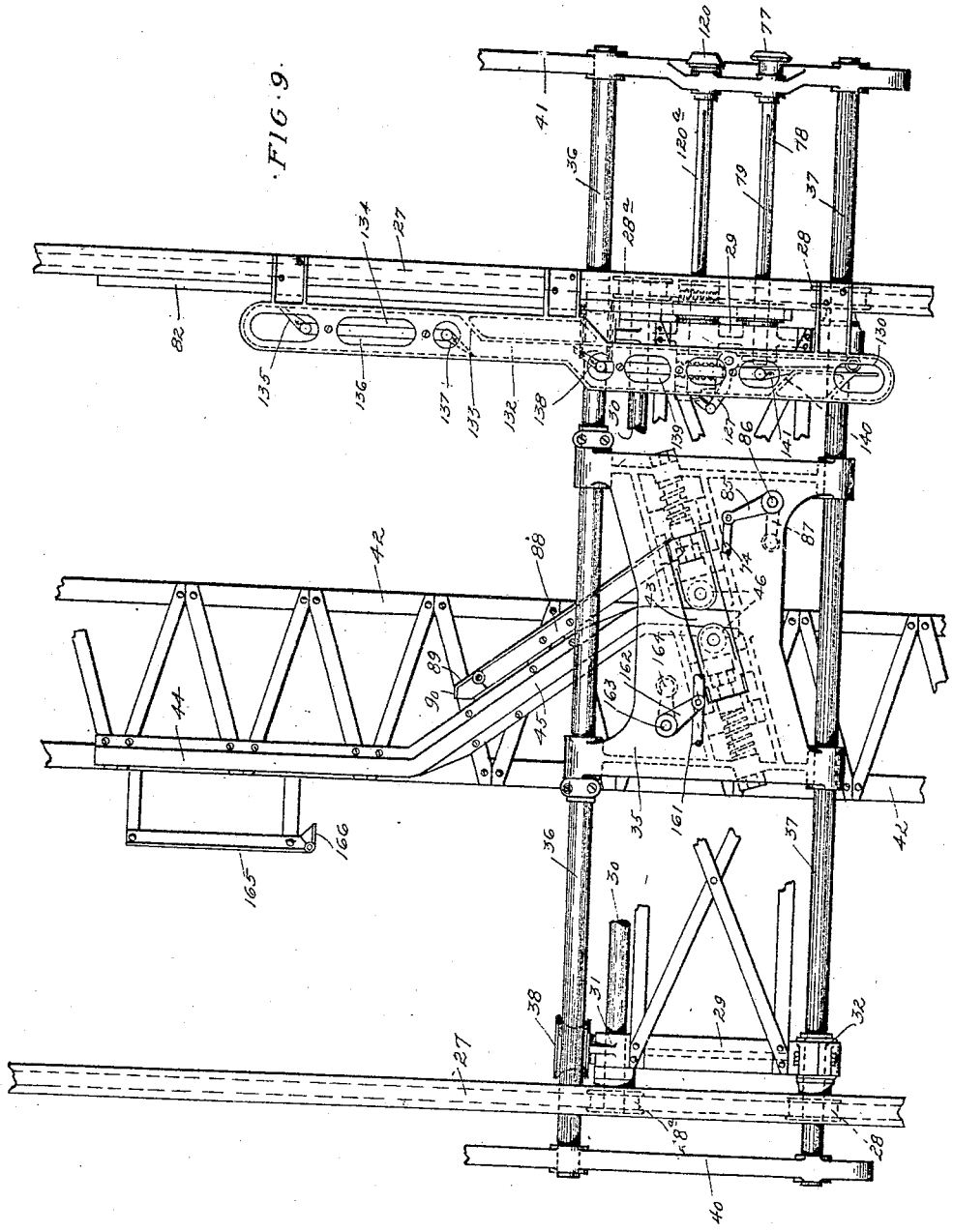
Figure 10:
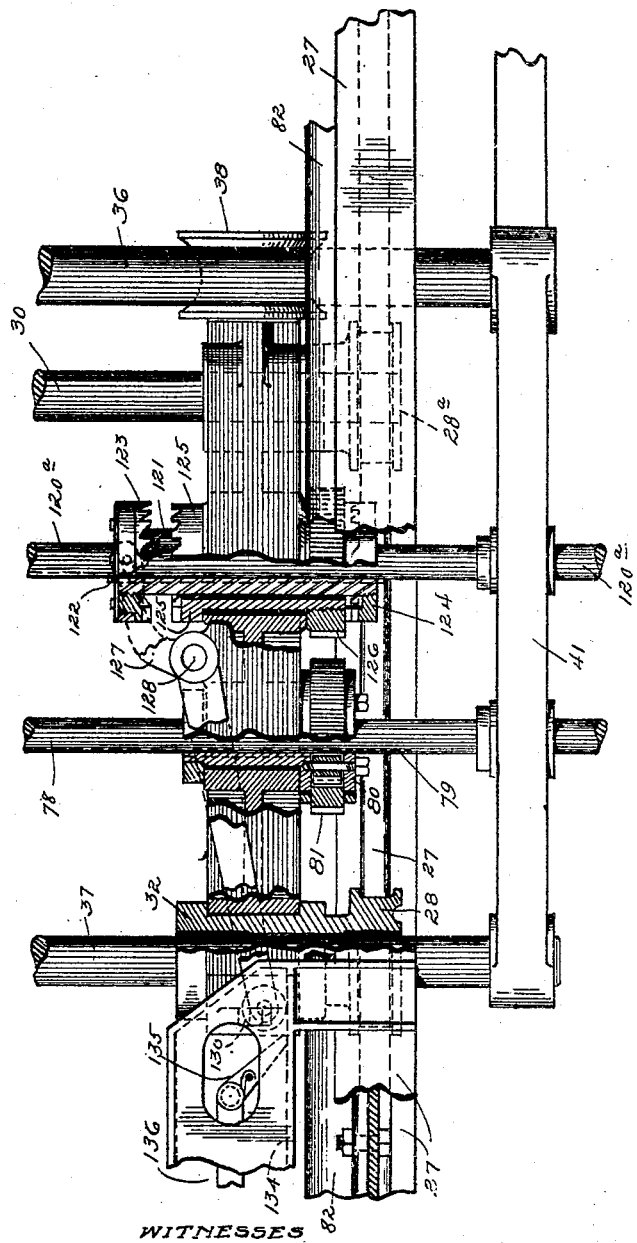

In the drawings, Figure 1 is an end elevation of my improved device showing it adjacent to a reel oven, the parts being in their outermost position. Fig. 2 is a section through the loader and the unloader and the charge shelf showing the parts in their innermost position. Fig. 3 is a plan view of Fig. 1, some of the parts being broken away for clearness of illustration. Fig. 4 is a front elevation of the machine as it stands in front of the oven. Fig. 5 is an elevation looking from the opposite end to that illustrated in Fig. 1, and showing also the oven actuating mechanism in elevation. Fig. 6 is an enlarged elevation of the oven operating device. Fig. 7 is an end elevation thereof. Fig. 8 is a plan view, the actuating wheel secured to the oven shaft being omitted. Fig. 9 is a plan view of the peeler carriage and part of the frame illustrating the guides, the tripping mechanism and other parts thereon. Fig. 10 is a plan partly in section through the end of the frame upon which the peeler carriage is supported illustrating the drive connections thereon.

1 represents the front wall of a reel oven, 2 the reel of the oven, and 3 and 4 shelves therein. The reel is supported upon the shaft 5 in the usual manner. Upon the end of the shaft 5 is the wheel 6 having a radial slot 7, Figs. 5, 6 and 7, which is adapted to be engaged by the pins 8 on the wheel 9, secured to the shaft 10. On the shaft 10 is a worm wheel 11 actuated by the worm on the shaft 12. 13 is a clutch pulley on the shaft 12 driven from any source of power, and 14 is a clutch keyed on the shaft adapted to engage and disengage the pulley 13 therewith. The clutch 14 is actuated by the lever 15 in the manner to be hereinafter described. When the clutch is in engagement the pins 8 entering and leaving the slots 7 will cause the reel to be partially rotated to bring the shelves in proper relation to the openings in the front of the oven. This reel operating mechanism is no part of my present invention.

In the construction herein shown I have illustrated a machine designed to charge a shelf of an oven with the dough, and also to unload another shelf of its baked goods. In this construction I have shown two openings in the front of the oven, 17 and 18 respectively, the opening 17 being the opening through which the crackers are loaded, and the opening 18 being the unloading opening. I have shown each opening as provided with a hinge door 19 and 20 respectively, these doors being hinged at their upper edges so that they will turn inward and backward as shown in Fig. 2, when the device is operated to load and unload.

25 is a frame which supports the operating parts, which frame is constructed in any desired manner and is stationary in front of the oven. On this frame near the top are the horizontal rails 27 and between these rails are the wheels 28 and 28ᵃ which form the support for a carriage 29. This carriage is a rigid frame of any desired construction which moves forward and back to and from the oven and carries the loading and unloading mechanism. I have shown the carriage as comprising a longitudinal bar 30 on the ends of which are fixed the wheels 28ᵃ, this shaft being journaled in suitable bearings 31 in the ends of the carriage frame. The wheels 28 are secured to a hollw stub shaft journaled in bearings 32 in the ends of the frame, (Fig. 10).

On the carriage 29 is supported the peeler frame 35, this frame comprising the central portion, which is lettered 35, and the two side bars 36 and 37 which extend through the portion 35 and beyond at each end. The bar 36 is supported on the grooved wheels 38 at the front side at each end of the carriage 29, while the bar 37 passes through the stub shaft of the wheel 28 and said wheel, these shafts being connected at their ends by the end frames 40 and 41. The peeler frame being thus supported is moved forward and back with the carriage and at the same time is free to have a longitudinal movement upon the carriage, being supported in the manner described.

42 is a middle horizontal extension of the supporting frame 25 and it carries on its upper surface a guide rail which has the two end straight portions 43 and 44 and the inclined middle portion 45. On the peeler frame are the two opposed guide rollers 46, preferably spring backed as shown, which in the forward movement of the carriage will engage with this guide rail and cause a longitudinal movement of the peeler frame on the carriage as will be plainly obvious from an inspection of Fig. 9.

The two end frames 40 and 41 have the forward extensions 47 and 48, the extension 47 forming a support for the unloading mechanism, and the extension 48 forming a support for the loading mechanism.

*Loading mechanism.*—I will first describe the loading mechanism.

50 is a feed belt for the cut dough which is preferably fed forward continuously from a continuous dough cutter of any suitable construction and not herein illustrated. This belt is driven in any known and usual manner. I have shown in Fig. 4 the belt as passing over the roll 51 at the right hand end of the machine, this roll being journaled in the stationary frame.

For convenience of description I will refer to the extensions 47 and 48 as the unloading frame and the loading frame, respectively, as such extensions with the connecting parts in effect form such frames.

In the loading frame and connecting the two side bars thereof are the two bars 52 and 53. Passing over these two bars 52 and 53 is a peeler belt 54 which also passes over the central roll 55 and suitable tension rolls 56, 57 and 58. The result of this construction is to provide a double inclined surface or peeling apron or belt passing at opposite ends over the bars 52 and 53 as plainly seen in Fig. 2. The roll 56 is driven and thereby the belt is likewise driven. The roll 56 has upon its end the sprocket wheel not shown which is engaged by the sprocket chain 59 which at its other end engages the sprocket wheel 60 on the shaft 61. Intermediate the two sprocket wheels at the opposite ends of the chain 59 is the idler sprocket 62 below the normal plane of the runs of chain so as to cause the chain to engage the sprocket wheel to drive the suction roll 63 which extends between the two end frames and surrounds the suction conduit 64 which is a stationary tube likewise extending between the two end frames and secured thereto.

65 is a suction conduit which extends between the two end frames and is connected at the opposite ends into the suction conduit 64. The object of connecting at both ends is to produce a more equal vacuum at all points of the tube 64.

The conduit 65 is connected at one end to a vertical pipe 70 which has the flexible portion 71 to allow for a continuous connection and still permit the travel of the peeler back and forward to and from the oven. In the vertical pipe 70 is a suitable valve for opening and closing the communication through this pipe or conduit. This valve is secured to the shaft 72 upon which is the rock arm 73 to which is attached the connecting rod 74 by means of which the valve is operated in the manner to be hereinafter described at the desired intervals.

The shaft 61 from which the peeler belt and the suction roll 63 is driven is in turn driven by the following mechanism. On its end is the bevel gear wheel (Fig. 1) which meshes with a bevel pinion on the shaft 75 journaled in the end frame 41. At the opposite end the shaft 75 has suitable bevel gear connection with the shaft 76 which has a bevel pinion on its end engaging with the bevel pinion 77 on the shaft 78 at the upper end of the machine. The shaft 78 is provided with the key way 79 in which the spline on the ratchet wheel 80 engages. Journaled around this ratchet wheel is the annular gear wheel 81, the ratchet being so constructed that as the carriage moves towards the oven the ratchet will be rotated by the gear wheel, but as the carriage moves away from the oven it will be engaged and the shaft 78 be rotated. The gear wheel 81 meshes with the rack 82 on the stationary frame so that the gear wheel is rotated in both the forward and backward movement of the carriage, but as described the shaft 78 will only be rotated as the carriage moves away from the oven. The shaft 78 being rotated, it will through the connection described rotate the driving roll 56 for the apron and the suction drum 63.

The suction valve on the shaft 72 will be opened and closed by the following mechanism. The rod 74 is slidingly supported on the carriage frame, (Fig. 3) and at its end it engages the rock arm 85 on the vertical shaft 86. Upon this shaft is also the rock arm 87. This rock arm has a suitable roller wrist which as the carriage moves forward runs upon the left hand side of the guide 88 secured to the middle extension 42. This guide has the hinge section 89 at its inner end which hinge section has the inclined guide flange 90. In the forward movement the roller wrist engaging this inclined flange 90 will turn it out of the way without actuating the valve and a suitable spring, not shown, will return the hinge portion 89 back to the position shown in Fig. 9. As the carriage comes back the roller wrist on the rock arm 87 will strike the inclined flange 90 which will cause the rock arm to move inwardly rocking the shaft 86, the rock arm 85 and the connecting rod 74 opening the valve. When the roller wrist reaches the end of the guide 88 it will be free to return to its normal position it being actuated by the spring 91 (Fig. 3), the valve being thereby closed.

Between the suction drum 63 and the suction conduit 64 are the packing strips 92 arranged on opposite sides of the port 93 at one side of the suction conduit 64. These packing flanges simply make a tight joint upon both sides of the port 93 between the suction conduit and the drum 63, the drum 63 being perforated at all points. The distance between these two packing strips 92 determines the width at which the vacuum will operate upon the cut dough.

*The unloading mechanism.*—The unloading frame has at its outer end the vacuum conduit 100 extending between the two side frames and secured thereto. Journaled in these end frames and surrounding the conduit 100 is the suction drum 101. This suction drum is of perforated material. The suction conduit 100 is provided with the port 102 and on opposite sides of this port are the packing strips 103. This suction conduit, drum and packing strips are similar to those already described for the loading mechanism. Extending across between the two side frames is the tapering hollow nozzle 104, the outer edge of this nozzle extending beneath the suction drum 101, as shown in Fig. 2. Passing over this tapering nozzle is the foraminous apron 105. This apron at its edges is provided with ratchet bars 106 to which are connected a series of sprocket chains 107 which run over sprocket wheels 108 secured to the shaft 109 (Figs. 2, and 3). The nozzle 104 has connected into it at one or more points the air conduits 110 which connect to a common header 111 which in turn is supplied through the conduit 112 extending to the side of the unloading frame and there connects into a vertical pipe having the flexible portion 112ª (Fig. 5). This pipe is supplied from any suitable source with air under pressure. Beyond the suction drum 101 is the pipe 113 provided with the inwardly tapering nozzle 114 having a slit at the apex. This pipe 113 is connected by the pipe or pipes 115 with the conduit 112 which as described connects to the air supply pipe 112ª.

A reciprocating motion is imparted to the apron 105 by the following mechanism: Upon the end of the shaft 109 is a bevel gear wheel 116 which meshes with a bevel pinion on the shaft 117 which through suitable bevel gears is driven from the shaft 118 which at its upper end has a bevel pinion 119 meshing with a gear wheel 120 (Fig. 1), at the upper end of the peeler frame. The further mechanism for driving this shaft is illustrated in Fig. 10. On the shaft 120ª is the sleeve 121 which has a key way engaged by a key or fin 122 on the shaft 120ª. At opposite ends this sleeve has the oppositely toothed clutch rings 123 and 124. Surrounding the sleeve 121 is the sleeve 125 which is provided with complementary teeth at each end for the engagement of the clutch rings 123 and 124. Secured to the sleeve 125 is an annular gear wheel 126 which meshes with the rack 82 previously described. The clutch sleeve 121 is operated by a lever 127 which is journaled at 128, suitable connections being made between this lever and one end of the sleeve to actuate the sleeve longitudinally and at the same time permit of the rotation of the sleeve in relation to this connection. The lever 127 is substantially a bell crank lever and is provided with the roller wrist 130 at its free end. This roller wrist engages the guide way with trips so that the clutches will be thrown in and out of engagement to effect the desired operation. It is desired to have the inclining run of the belt commence to travel to the left as the forward edge of the nozzle 104 reaches the outer edge of the shelf 4 and continue this movement during the travel of the nozzle across the shelf. It is desired that the belt shall not travel while the unloading device is moving from the position shown in Fig. 2 to the position at which the outer end of the nozzle 104 reaches the inner edge of the belt 131, (this belt is a continuously moving belt for carrying off the baked goods), and from this point it is desired that the apron 105 shall reverse its movement while the nozzle 104 is traveling across the belt 131 and will remain without moving during the time that the nozzle 104 is traveling from the outer edge of the belt 131 to the inner edge of the belt. These various startings and stoppings of the apron 105 are accomplished by the engagement of the roller wrist 130 through the following guides and trips. The roller wrist travels along the straight guide way 132 (Fig. 9), until it reaches the inclined guide 133. At this point the nozzle 104 has reached the outer edge of the shelf 4. At this point as previously described the inclined portion of the belt has started to travel to the left. During this time the roller wrist is traveling on the straight portion of the guide way 134. As it reaches the end of its travel in the guide way it passes the spring trip 135, lifts that trip which immediately flies back behind it, actuated by a suitable spring, not shown, to the position shown in Fig. 10. As the unloader starts in the return movement the roller wrist will strike this trip 135 and be deflected to the left, thereby bringing it into the plane of the guide 132, in the guide way 136. This will hold the sleeve 121 in its middle position so that both of the heads 123 and 124 will be out of engagement with the sleeve 125. It will pass the spring trip 137 and will then engage the spring trip 138 which is moved in its forward movement and will run thence over the guide 139 during which time the belt will have the reverse movement previously described until it reaches the inclined guide 140 in passing across which it will operate the trip 141 and thence return to the middle or inoperative position of the clutches.

On the end of the suction drum 101 is a gear wheel 150 (Fig. 3) which meshes with the gear wheel 151, which gear wheel has a bevel gear wheel meshing with the bevel pinion 152 on the shaft 153, which at its upper end has the spiral gear 154 which meshes with the corresponding gear 155 on the shaft 118, previously described. The lever 127 which controls the operation of the clutches 123 and 124 actuated by the gear wheel 126, as previously described, operates this shaft 118 and therefore the rotary movement of the suction drum 101 will correspond to the movements of the apron 105. That is, the drum will be rotated at the same times that the belt is being actuated.

Air under pressure is admitted into the pipe 112 from any suitable source, and passes through the conduits 110 and 115, thereby bringing air under pressure into the nozzles 104 and 114 upon opposite sides of the suction drum. The air supply to this nozzle is controlled by valves 160 (Fig. 5). This valve has connected to its actuating rock arm a connecting rod 161 (Fig. 9) connecting to the rock arm 162 on the shaft 163. Below this rock arm 162 on the said shaft is a rock arm 164 having a roller wrist thereon which in the forward movement of the carriage is not actuated until the roller wrist on the rock arm 164 reaches the outer end of the guide 165 at which point it strikes the hinge portion 166 thereon, said hinge portion being held against movement in this forward movement of the roller wrist on the rock arm 164, thereby causing the rock arm to be actuated rocking the shaft 163 and opening the air valve to admit air during the further travel of the carriage, during which time the roller wrist on the rock arm 164 will ride against the guide 165. As it reaches the end of its movement inward the roller wrist will pass the end of the guide 165 and a suitable spring 167, (Fig. 3), will rock the valve to its closed position which movement will throw the roller wrist 164 inside of the guide flange 165. In the outward movement of the carriage the roller wrist will impinge against and rock the hinge portion 166 but without actuating the valve.

*The carriage actuating mechanism.*—The carriage 29 is moved forward and back on the frame by any suitable mechanism. The mechanism I have shown for actuating the carriage consists of the following: 171 is a drive shaft driven from any suitable source of power. On this is a gear wheel 170 meshing with a gear wheel 172 on the shaft 173, Figs. 4 and 5. On the end of the shaft 173 is a crank arm 174 which is connected to a crank 175 on a shaft 176 by a connecting rod 177. On the shaft 176 is a drum 178 to which is secured a cable or rope 179. This cable is wound about the drum 178 and also about the drum 180 at the upper end of the frame. Beside the drum 180 and secured thereto or to the same shaft is a larger drum 181 on which is a cable 182 which passes around the drum 181, around a sheave 183 fastened to the oven front, and has its opposite ends connected to opposite sides of the carriage at 185 and 186.

The rotation of the crank 174 causes a rocking movement to be imparted to the crank 175 which rocking movement will by the cables described impart a reciprocating movement to the carriage 29. This reciprocating movement will project the loading and unloading mechanism into the oven in operative relation to the oven shelves and withdraw it therefrom. This forward and backward movement of the carriage operates the clutch 14 already described and thereby controls the rotation of the reel oven. This is accomplished by the following mechanism: To the outer end of the lever 15 is connected a rod 190 which extends outwardly and upwardly to the bell crank lever 191, Fig. 3, to one end of which it is connected. To the other end of the bell crank lever is connected a rod 192 which connects to the bell crank 193 the other end of this bell crank having an actuating rod 194 which extends out on the frame opposite the path of the carriage. On the frame is pivoted a spring actuated lever 195 (Fig. 5) which is in the path of a portion of the carriage. In this case I have shown it in the path of the shaft 36. This lever is so constructed that in the forward movement of the carriage this shaft may strike it and the lever will yield without actuating the clutch, the lever preferably being made in two parts with a rule joint and a spring to return it normally to the upright position shown in Fig. 5. In the backward movement of the carriage the shaft 36 will strike the lever 195 and will rock it, thereby pushing in the actuating rod 194 and through the connections described throwing the clutch 14 into operating relation with the drive pulley 13 thereby imparting a drive movement to the wheel 9 which will rotate the oven a partial revolution moving the shelf 4 to the position of the shelf 3. The clutch 14 is held in engagement with the drive wheel 15 as soon as it has been entered into engagement by any suitable means until the wheel 9 has made a half revolution and then by automatic mechanism it is disengaged ready for another operation. I do not deem it necessary to describe this mechanism for it is already described in another application of myself and Anton Mill.

If I desire, as is necessary with some goods to have the oven move two shelves so as to have an empty shelf pass around the oven to get heated between baking operations, I place a second lever 198 similar to the lever 195 so that in the outgoing movement of the carriage the oven will be caused to be actuated twice that is the wheel 9 will make a complete revolution and move the reels a space equal to the distance of two of the shelves for each reciprocation of the carrier.

*Operation.*—The parts being thus constructed, their operation is as follows: The cut dough in the usual sheet form comes from a continuous cutter, being fed from the cutter (not shown) along the belt 50. The peeler being actuated to its innermost position as shown in Fig. 2, the dough will be gathered on the belt 54 in the return movement at which time there will be in front of the peeler a charge of cut dough or a cut dough strip. As the cross bar 52 reaches the inner edge of the belt 50 (Fig. 2) that belt traveling to the right with its upper run and the suction drum 63 rotating by the mechanism described, the cut dough strip will be picked up by the suction applied through the port 93 and through the perforations in the drum 63 and will be deposited upon the apron 54 each successive row of crackers being picked up in the same way in which they rest upon the belt 50 and be carried over the rest upon the upper surface of the belt 54. The packing strips 92 are so located as to permit the suction to take place so as to pick up the forward edge of the cracker and as the suction drum passes over to pick up the remainder thereof, and then as the forward edge of the cracker reaches a point above the apron it will pass the upper packing strip, whereupon the suction will be released and the crackers will drop upon the apron. The guide 45 for the peeler frame will cause the peeler not only to have an outward movement but a transverse movement synchronous with the forward travel of the continuously moving cut dough strip so that the peeler will take up the cut dough during the travel thereof. The motion of the carriage is now reversed and the peeler projected into the oven again as shown in Fig. 2, directly over one of the shelves 3. In the inward movement of the peeler or the loading or charging device, the nose thereof will strike the door 19 and cause it to open as shown in Fig. 2. When the parts have reached the position shown in Fig. 2, the belt 54 will again be actuated and as the peeler withdraws from the oven the crackers will be deposited upon the shelf 3 in precisely the same way and arrangement as they formerly rested upon the belt 50 and the door 19 will be closed as the peeler withdraws to collect another charge.

With the construction which I have shown and in which the charging mechanism is combined with the unloading mechanism, the crackers on the shelf 4 will be unloaded and picked up upon the belt 105 as the unloading device moves inwardly from the position shown in Fig. 1, to that shown in Fig. 2. This is accomplished as follows: As the carriage carrying the unloader frame moves inward the air pressure valve is opened and air will be discharged through the nozzles 104 and 114 these air currents being opposed to each other. The suction drum 101 will also be rotated and a partial vacuum be produced in the conduit 100. As the forward end of the nozzle 104 reaches the outer end of the shelf 4 these opposing air currents being directly downwardly will tend to pass under both sides of the crackers and this will either partially lift the crackers or tend to lift them up against the suction drum 101 opposite the member 102 whereupon the vacuum or the partial vacuum in the space between the packing rings 103 will hold the crackers against the drum 101 and carry them up upon the apron 105 where they will be dropped as soon as the upper packing 103 is passed and the vacuum ceases to be effective. In this way all the crackers on the shelf 4 will be picked up from that shelf and carried up and rested upon the apron 105 in the same way in which they rest upon the shelf. During the outward movement of this unloading device when the outer end of the nozzle 104 reaches the inner edge of the belt 131 the apron 105 will be driven in the reverse movement, that is the upper run will move to the right and the crackers will be deposited upon the belt 131 in the same way in which they were originally taken from the belt 50 and they may be carried on this belt 131 to any desired point in the factory for packing purposes. With this mechanism therefore the continuous strip of cut dough may be fed from a continuously operating cutter on to the belt 50, be charged upon an oven shelf of a reel oven, be then carried around the oven and baked, and be removed from the shelf and delivered in the same way in which they were originally cut upon the delivery belt which will carry them from the oven.

It is obvious that by the mechanism described that during the time that the loader and unloader have withdrawn from the oven the shelf 4 will be moved from a position opposite the unloading device to a position opposite the loading device, or if a double actuating device for the oven is employed that every other shelf will be loaded during the revolution of the reel.

What I claim as my invention is:

1. In a machine for transferring crackers and dough, a reciprocating frame, a dough transfer device thereon, and a cracker transfer device thereon, each transfer device comprising means for picking up the articles from a support, transferring them, and delivering them to another support.

2. The combination of supports for cut dough and crackers arranged at different levels, of a reciprocating transfer device for each support, one transfer device adapted to deliver cut dough upon one support, and the other to remove crackers from the other support, at each reciprocation.

3. The combination of supports for cut dough and crackers at different levels, a reciprocating transfer device for each support, said devices traveling together, one transfer device adapted to deliver cut dough upon one support, and the other to pick up and remove crackers from the other support, at each reciprocation.

4. The combination with a reel oven having a lateral opening, a shelf therein adapted to support a series of rows of baked crackers thereon, a reciprocating transfer device adapted to travel over said shelf into and out of the oven through said opening, and means on said transfer device for picking up, carrying away and delivering crackers at each reciprocation.

5. The combination with a shelf for a layer of a series of rows of crackers, and a carrier beside the same, of a transfer device reciprocating across the two, and means on the transfer for picking up the crackers from the shelf, carrying them to the carrier and depositing them thereon in the same order in which they were on the shelf.

6. The combination with a reel oven having a series of horizontal shelves in a baking chamber, each adapted to support a series of rows of crackers, of an unloading device adapted to be projected into and out of the oven, and means thereon for picking up said crackers and depositing them outside the oven in similar order.

7. In a device of the kind described, the combination of a reciprocating frame, two transfer devices thereon, feed and discharge supports for each transfer, one transfer device adapted to pick up its charge from the outer support and deliver it to the inner support, and the other transfer device to pick up its charge from the inner support and discharge it upon the outer support at each reciprocation, and means for operating the frame and transfer devices.

8. The combination of a feed belt adapted to receive and carry a cut dough strip comprising a series of rows of dough sections for crackers, a transfer device adapted to be reciprocated across said belt, said transfer device having means for picking up the rows of such dough sections successively, for supporting them after they are picked up, and depositing them successively at another point at each reciprocation.

9. The combination with a traveling feed belt, of a device for transferring articles laterally from the feed belt, comprising a reciprocating peeler, and means for causing said peeler to travel with said belt during its charging operation over the belt.

10. The combination with the shelf of a reel oven, of a traveling feed belt outside and adjacent thereto, a transfer device comprising a peeler reciprocating transversely over the belt and shelf, means for delivering the charge upon the shelf and collecting the charge from the belt in the outward movement thereof.

11. A reciprocating transfer mechanism, comprising a mechanism for picking up the articles by pneumatic means, and a supporting and discharging device moving with the pick up device to which said pick up device delivers the goods and from which they are discharged.

12. A transfer device comprising mechanism for picking up the articles by pneumatic means, and delivering the articles to a carrier, said carrier, moving with the pick up mechanism upon which the articles are supported, and means for moving said carrier to receive and deliver the articles.

13. A transfer device comprising a reciprocating frame, a pneumatic pick-up device, and a carrier to which it delivers the goods, located on said frame.

14. A transfer device comprising a reciprocating frame, having thereon a rotary suction drum, a carrier adjacent to the drum, said drum having a suction means operating only adjacent to the carrier, whereby articles picked up by the suction drum will be dropped upon the carrier, means for operating the drum and carrier.

15. The combination with a traveling feed belt, of a transfer device reciprocating across said belt, and comprising mechanism for picking up the articles on the belt, and a carrier to which the pick up device delivers the articles.

16. The combination with a traveling feed belt, of a transfer device having a reciprocatory movement over said belt, and traveling with the belt while moving across the same, and comprising a pick up device and a carrier to which the pick up device delivers the article, and means for moving said carrier to support and then discharge the picked up articles.

17. The combination with a traveling feed belt, of a transfer device reciprocating over said belt and moving with the same while moving thereover, comprising a rotary suction drum, and a carrier belt, said drum having connection with the suction means only at a point over the receiving portion of the carrier belt, and means for moving the belt and drum.

18. The combination with a receiving shelf, and a feed belt adjacent thereto, of a loading and discharging device comprising a pick-up device and a holding device to which the pick up device delivers the goods, and means for reciprocating the loading device back and forth from the belt to the shelf and back again, and means for discharging the goods and picking up a fresh charge during the return movement of the device.

19. In a loading device, the combination of a frame, a feed belt thereon, a pick up device at one end of the belt adapted to pick up articles, and deliver them to the belt, and means for moving the belt to receive and hold the articles at one end, and to discharge them at the other end.

20. In a loading device for bakery goods, an endless belt, a reciprocating frame, a frame bar secured to the ends of the frame over which the belt passes to form receiving and delivery loops, and drive mechanism for the belt.

21. In a loading device for bakery goods, a reciprocating frame, cross bars secured thereto, an endless belt passing over the bars to form receiving and discharge loops, and intermediate drive and tension devices for the belt.

22. In a loading device for bakery goods, a frame, bars secured thereto at the ends of the frame, an endless belt looped over the bars, and an intermediate roll over which the belt passes to form the upper run of belt in a double incline.

23. In a loading device for bakery goods, a frame, bars at the ends of the frame, an endless belt looped over the bars, intermediate drive devices for the belt, and a pick up device carried by the frame adjacent to one loop adapted to pick up and deliver articles to the belt.

24. In a loading device for bakery goods, a frame, cross bars carried by the frame, an endless belt looped over the bars, a pick up device adjacent to one loop, means for reciprocating the frame, and for driving the belt.

25. In a loading device for bakery goods, the combination with a feed belt, a loading device adapted to take the goods therefrom and deliver them to another point, comprising a frame, bars at the ends of the frame, an endless belt looped over said bars, a pick-up device adjacent to one loop of the belt, means for driving the belt and pick up device, and means for reciprocating the frame across the feed belt and for causing it to travel with the feed belt while crossing the same.

26. In a pick-up device, the combination of the suction conduit, having a port or slot, a perforated rotary suction drum around the conduit, means for limiting the suction effect through the drum to a point opposite the port, and a carrier projecting under the drum at the point where the suction effect ceases.

27. In a pick-up device, the combination of the suction conduit having a port or slot, a perforated rotary suction drum around the conduit, packing which allows free rotation of the drum between the drum and conduit on both sides of the port or slot.

28. In a pick-up device, the combination of the suction conduit having a slot, a perforated rotary suction drum around the conduit, packing which allows free rotation of the drum between the drum and conduit at both sides of the slot, and a driven endless belt looped over a cross bar beneath the slot, for the purpose described.

29. In a loading device, the combination of a frame, an endless belt looped at opposite points over bars, an intermediate mechanism for intermittently driving the belt in one direction, a pick up mechanism over one loop, and means for reciprocating the device from a supply to a discharge point.

30. A transfer device comprising an apron or belt, a cross-bar over which the belt is looped, means for reversing the travel of the belt, and a pick-up device supported adjacent the loops over the cross bar and adapted to deliver the articles on the belt in the direction of travel of the belt, the parts being constructed and arranged for the purpose described.

31. A transfer device comprising a frame, a pick up mechanism thereon adapted to pick up and deliver articles to an apron or belt, said belt, a cross bar over which the belt is looped, means for reversing the travel of the belt to store and discharge the articles, and means for reciprocating the frame.

32. A transfer device comprising a frame, a pneumatic pick-up mechanism thereon, adapted to pick up and deliver articles to an apron or belt, said belt, a cross bar over which the belt is looped, means for reversing the travel of the belt to store and discharge the articles and means for reciprocating the frame.

33. In a pick up device, a rotary suction drum having the suction effective over a section only of its surface, and means for applying air currents beneath the article.

34. The combination with a support for articles, of a pick-up device comprising a movable perforated carrier, a suction conduit having a slot over which the carrier moves, and means for applying air currents beneath the articles on the support.

35. The combination with a support for articles, of a pick-up device comprising a movable perforated carrier, a suction conduit having a slot over which the carrier moves, and means for applying opposed air currents beneath the articles on the support.

36. The combination with a support for articles, of a frame, a hollow perforated cross bar thereon, a perforated apron looped around the bar, a suction pick-up device adjacent to the loop, an air pressure connection to the hollow bar, and an opposed nozzle having an air supply connection.

37. The combination with a support for articles, a frame, a cross bar thereon, an apron looped over the cross bar, a pick-up device adjacent to the loop, a movable belt adjacent to the support, means for reciprocating the frame to the support and over the belt, means for driving the looped belt in reverse directions, and means for moving the frame transversely the belt and longitudinally with the belt during the transverse movement.

38. The combination with a shelf, of a movable belt adjacent thereto, of a reciprocating transfer device for removing baked crackers from the shelf and depositing them on the belt, comprising a pick-up device and a reciprocating looped apron, means for actuating these devices to pick-up the baked crackers, and deliver them on the apron in the inward reciprocation, and to deposit them from the apron onto the belt in the outward reciprocation, and means for causing the discharging device to move with the belt during its transverse movement thereover.

39. In a cracker dough handling mechanism, the combination of a shelf, a feed belt adjacent thereto, a carriage, means for reciprocating the carriage, a loading mechanism on the carriage having means for picking up the dough sections from the feed belt, supporting them during the travel and depositing them on the shelf, and means for causing said feed mechanism to travel longitudinally with the belt in traveling across the same.

40. In a cracker handling mechanism, the combination of a feed belt and a shelf, a carriage, means for reciprocating the carriage, an unloading mechanism on the carriage, means on the unloading device for picking up baked crackers from the shelf, supporting them during its travel and depositing them on the feed belt, and means for causing said unloading mechanism to travel longitudinally with the belt in traveling across the same during the unloading operation.

41. The combination of a pick-up mechanism, a movable belt or apron to which the pick-up delivers the articles lifted, a reciprocating carriage on which the pick up mechanism and belt are supported, and means for driving the pick up mechanism and belt by the reciprocation of the carriage.

42. A transfer mechanism comprising a peeler, a pick-up device adapted to pick up in a continuous operation a series of rows of articles such as cut dough sections, and deliver them in the line of travel of the peeler belt travel, and means for moving the peeler belt to receive and discharge the articles thus picked up.

43. The combination with a feed belt, a transfer mechanism comprising a frame having thereon a rotary pick up device adapted to pick up articles such as cut dough sections from the feed belt, a peeler to which said pick-up delivers the articles, and means for carrying the articles to another point and discharging the articles from the peeler.

44. The combination of a reciprocating carriage, of a transfer mechanism comprising a pick-up, holding and discharging mechanism supported on the carriage, and means for causing the transfer mechanism to move laterally on the carriage during the travel of the latter.

45. The combination with a support for articles such as crackers, of a pick up device comprising a ported suction conduit, a traveling perforated carrier moving over said ported conduit, and means for directing pressure beneath the articles on the support at a point beneath the port in the conduit.

In testimony whereof I affix my signature in presence of two witnesses.

ALEXANDER W. COPLAND.

Witnesses:
   H. C. SMITH,
   ED. D. AULT.